INVENTOR
M. A. DUGUAY
BY
ATTORNEY

United States Patent Office 3,560,874
Patented Feb. 2, 1971

3,560,874
VARIABLE OPTICAL FREQUENCY SHIFTER
Michel A. Duguay, Berkeley Heights, N.J., assignor to Bell Telephone Laboratories, Incorporated, Murray Hill and Berkeley Heights, N.J., a corporation of New York
Filed Oct. 12, 1966, Ser. No. 586,153
Int. Cl. H01s 3/10
U.S. Cl. 331—94.5                      6 Claims

ABSTRACT OF THE DISCLOSURE

The optical frequency of a coherent optical pulse train is shifted by means of an electro-optic crystal to which is applied a sinusoidal electric field synchronized in frequency (with the pulse repetition rate) and phase with the pulse train. The phase is adjusted such that refraction index of the crystal is changing at its fastest rate when a pulse transverses the crystal. The change in index of refraction of the crystal is directly proportional to the magnitude of the applied electric field, hence the total frequency shift is governed by the number of reflections and the applied field, the magnitude of which is made controllable.

---

This invention relates to optical maser arrangements, and, more particularly, to such arrangements producing outputs which are tunable over a band of frequencies.

The optical maser as a generator of coherent light has numerous potential uses. A great deal of attention has been focused on its utility in the field of communications and related areas, but one of its potentially useful applications is as a stable source of optical frequencies for use, for example, in multiple resonant experiments in various atomic and molecular systems, or as a frequency standard for use in other experimental studies. For such applications, it is desirable that the generator be tunable over a range of frequencies and that it be stable at whatever frequency in the range it is tuned to. There are numerous tuning arrangements for lasers that are in existence or that have been proposed. However, most of them lack the precision or the stability necessary in optical frequency experiments.

The present invention makes use of the fact that a Doppler shift in the frequency of a light beam occurs in a crystal of electro-optic material under the influence of an applied varying electric field. This phenomenon can be utilized to produce output light, the frequency of which is continuously variable over a band of frequencies.

In an illustrative embodiment of the invention, the output of a mode-locked laser of the type, for example, shown and described in U.S. Pat. 3,412,251, of L. E. Hargrove, filed Apr. 24, 1964, and issued Nov. 19, 1968, is directed into and through a crystal of suitable electro-optic material, such as, for example, lithium metaniobate. At the same time, means are provided for applying a sinusoidally varying electric field derived from the laser output across the crystal. Suitable means are provided for adjusting the phase of the electric field so that the light pulses from the laser pass through the crystal at a time when the refractive index of the crystal is increasing or decreasing, preferably at its fastest rate, due to the applied electric field. As will be more apparent hereinafter, the changing index of refraction produces a Doppler shift in the frequency spectrum of the applied light pulses. Reflecting means are provided at either end of the crystal so that each pulse makes several traversals through the crystal, and a Doppler shift occurs with each traversal of the crystal, hence significant shifts in frequency are obtained. The change in index of refraction of the crystal is directly proportional to the magnitude of the applied electric field, hence the total frequency shift is governed by the number of reflections and the applied field, the magnitude of which is made controllable.

In another embodiment of the invention, the crystal is enclosed in a resonator formed by a pair of mirrors having different reflectivities. Specifically, the input mirror is made transmissive at the input frequency and reflective at all other frequencies while the output mirror is transmissive at the desired output frequency and reflective at all other frequencies. With such an arrangement the output frequency is quite stable.

It is a feature of the invention that the pulsed output of a mode-locked laser is passed through a synchronously excited electro-optic crystal to produce a Doppler shift in the frequency of the applied pulses.

Various other features and advantages of the present invention will be more readily apparent from the following detailed description, taken in conjunction with the accompanying drawings, in which.

Figure 1A:
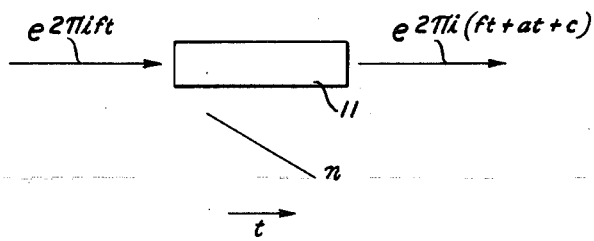
FIGS. 1A and 1B are diagrams illustrating certain basic principles of the present invention.
Figure 1B:
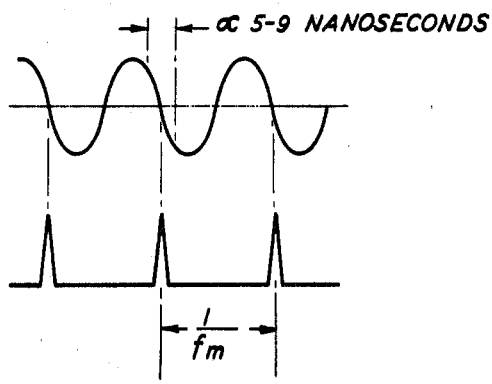

The principles upon which the present invention are based can be understood by reference to FIGS. 1A and 1B.

In FIG. 1A there is shown a hypothetical medium 11 having a refractive index $n$ that decreases linearly with time. An optical wave of frequency $f$ incident upon the medium 11 emerges from the medium with a linearly increasing phase advance which makes it indistinguishable from a wave up-shifted in frequency by the amount $$a = \frac{d}{dt}\left(\frac{nl}{\lambda}\right) \text{ cycles/sec} \quad (1)$$

where $t$ is time, $l$ the length of the medium, and $\lambda$ the wavelength in a vacuum. In practice, of course, medium 11 has never been realized. It is a simple matter, on the other hand, to make the refractive index $n$ of a material vary sinusoidally with time.

In FIG. 1B there is shown the effect on medium 11 when its refractive index $n$, which varies with an applied voltage, is driven at a frequency $f_m$. It can be seen that the refractive index varies sinusoidally with time at the frequency $f_m$. When a series of light pulses having a pulse repetition frequency $f_m$ is applied to the medium, each pulse encounters the same index of refraction change as every other pulse. The phase of the driving voltage and the incident pulses may, therefore, by synchronized so that each pulse encounters a substantially linearly decreasing index of refraction, as shown. As a consequence, the frequency spectrum (Fourier components) of each pulse is up-shifted by the amount in Equation 1. This frequency shift is, essentially, a Doppler shift. It can be seen from FIG. 1B, furthermore, that changing the phase relationship of the pulses and the driving voltage changes the amount of frequency shift and can even change the direction of the frequency shift.

Figure 2:
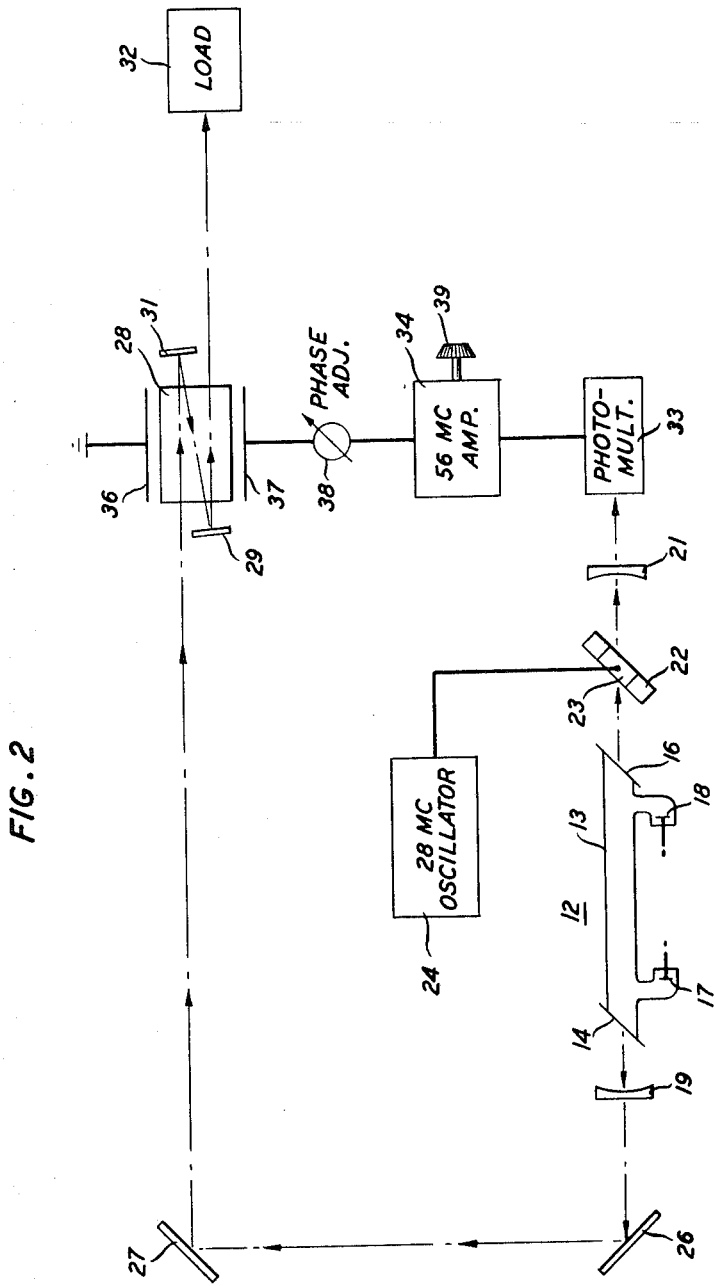
FIG. 2 is a schematic representation of an illustrative embodiment of the invention.

In FIG. 2 there is shown an embodiment of the invention which accomplishes the operation depicted in FIG. 1B to produce frequency tuning of a laser output. The arrangement of FIG. 2 comprises a mode-locked laser of the type shown and described in the aforementioned Hargrove patent. As disclosed in that patent, the mode-locked laser 12 comprises an elongated tube 13 containing a gaseous active medium and having transparent end portions 14 and 16 inclined at the Brewster angle. The active medium may be excited by any suitable means, which, for purposes of illustration only, is depicted as a pair of electrodes 17 and 18 which create an electrical discharge in the gas upon application of a D-C voltage from a suitable source, not shown. The tube 13 is located within an optical cavity defined by partially transmissive mirrors 19 and 21.

Located within the cavity resonator between end 16 of tube 13 and mirror 21 is a modulator 22 which prefferably comprises a fused quartz block. An ultrasonic standing wave is induced in the modulator 22 by a transducer 23 mounted on the block 22 and connected to a 28 mc. oscillator 24. Because block 22 is essentially homogeneous twice per period, the light wave created by the combination of tube 13 and mirrors 19 and 21 is modulated at a 56 mc. frequency.

Figure 3:
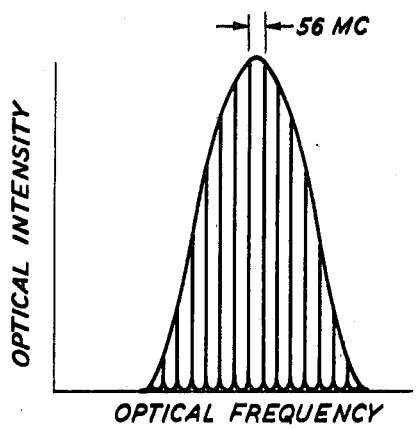
FIG. 3 is a diagram of a pulse waveform that occurs during operation.

As is described in detail in the Hargrove patent, the output of such an arrangement 12 is a series of pulses of uniform amplitude and a repetition frequency of 56 mc. Each pulse is made up of a plurality of frequencies resulting from the oscillating modes in the resonator, and, on a frequency basis, consists of a plurality of sharp spikes (each spike representing an oscillating mode) uniformly spaced 56 mc. apart, as shown in FIG. 3.

In the arrangement of FIG. 2, one output of the mode-locked laser 12 is taken through mirror 19 and directed by means of reflectors 26 and 27 into a medium 28 characterized by an index of refraction change ($\Delta n$) with change in an applied electric field, i.e., electro-optic effect. One such material is lithium metaniobate $$(LiNbO_3)$$

and for purposes of illustration, member 28 may be considered as a crystal of $LiNbO_3$. A pair of reflecting members 29 and 31 are positioned adjacent the ends of crystal 28 in such a manner that the pulse train from the mode-locked laser 12 passes through crystal 28 three times before emerging and passing to a suitable load or utilization device 32.

A second output from the mode-locked laser 12 is taken through mirror 21 and directed to a photomultiplier 33, which may be any one of a number of suitable types. The optical frequency pulse train impinging on photomultiplier 33 results in an electrical output from the photomultiplier having a frequency of 56 mc. This 56 mc. output is amplified in a tuned 56 mc. amplifier 34 and applied to crystal 28 as shown. The arrangement shown for applying the 56 mc. wave to the crystal 28 is simply a pair of plates 36 and 37. It is intended that plates 36 and 37 represent any one of numerous arrangements for applying a field to an electro-optic crystal known in the art.

In order that the phase relationship shown in FIG. 1B can be achieved, a phase shifter 38 is included in the circuit between amplifier 34 and plates 36 and 37 to advance or retard the phase of the 56 mc. wave relative to the pulse train so that their relationship is as shown in FIG. 1B. For a typical crystal 28, it takes a pulse approximately 0.2 nanosecond to traverse the crystal. Inasmuch as that portion of the 56 mc. sine wave that represents a decreasing index of refraction is from approximately 5 to 9 nanoseconds long, it can be seen that a pulse can be made to traverse the crystal several times before emerging. Inasmuch as the pulse is up-shifted in frequency with each pass or traversal, a large frequency shift is obtained. It should be understood that by frequency shift is meant a shift in optical frequency of each of the mode spikes shown in FIG. 3. The mode spacing remains the same, as does the pulse periodicity; however, the frequency composition of each pulse has been up-shifted in frequency. Obviously, down-shifting can be achieved in the same way by adjusting the phases of the pulses and waves to where each pulse "see" an increasing index of refraction.

In a typical arrangement, a slab-shaped single domain crystal of lithium metaniobate approximately 2.7 x 11 x 31 mm. in size, with the c-axis perpendicular to the largest surface, is placed in a sinusoidally varying field along the c-axis. The electric field is produced at the open end of a shorted quarter wave strip line fed by a push-pull 56 mc. amplifier. The change in the refractive index for light polarized along the c-axis, the case here, produced by an electric field E is given by $$\Delta n = -n_e^3 r_{33} \frac{E}{2} = -1.64 \times 10^{-8} E \qquad (2)$$

where $n_e$ is the extraordinary index (equal to about 2.20 at $\lambda = 0.633$ microns), $r_{33}$ is the appropriate electric-optic coefficient (equal to $3.08 \times 10^{-9}$ cm./volt) and the electric field E is expressed in volts per centimeter. For a maximum field of approximately 3 kilovolts per centimeter, the Doppler shift for one traversal of the crystal is about 850 mc. Much larger shifts can be obtained by increasing the number of traversals of the crystal (provision being made for anti-reflection coatings on the crystal to reduce losses), increasing the amplitude of the applied field, and altering the wave shape of the applied field. When the amplitude of the applied field is increased, the shape of the index of refraction change, i.e., the rate of change is increased, and the shift per traversal is greater. To this end an amplitude control adjustment 39 is provided for amplifier 34. When the number of traversals is fixed, this represents a reliable way of tuning the output of the crystal 28 over a wide range of frequencies. The output may also be tuned by the phase shifter 38; however, this method tends to introduce nonlinearities into the operation of the system.

Inasmuch as a sine wave even in the region of maximum slope is not linear, the index of refraction change in that region is not, strictly speaking, linear. Linearity may be closely approximated, however, and the time of maximum index of refraction change lengthened by altering the wave shape of the applied 56 mc. wave. Thus if both the fundamental 56 mc. wave and the third harmonic thereof are applied to the crystal in opposite phase relationship and proper amplitudes, the total applied field has a more linear serrated shape than a sine wave, giving a more linear index of refraction change. A wide variety of wave shapes may be achieved by thus adding or subtracting various harmonics of the fundamental wave in the proper proportions.

Figure 4:
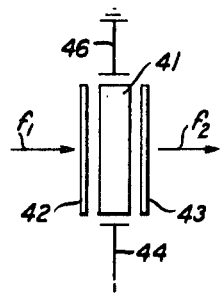
FIG. 4 is a diagrammatic representation of a modification of the invention of FIG. 2.

In the arangement of FIG. 2, it is possible to increase the number of traversals of the crystal by proper positioning of the mirrors 29 and 31 so that each pulse makes only one traversal of the crystal per cycle of the applied field. This can be achieved by insertion of an optical delay line or spacing the mirrors a large distance apart. In FIG. 4 there is shown an arrangement whereby a large number of traversals per half cycle of applied field may be achieved. For simplicity, only the frequency shifting arrangement has been shown.

The arrangement of FIG. 4 comprises a suitable crystal 41 mounted in a cavity resonator defined by reflecting members 42 and 43 and having suitable means 44 and 46 for application of the synchronous voltage to the crystal. In order that a large number of traversals of crystal 41 may be achieved, input mirror 42 is made transmissive at, for example, the center frequency $f_1$ of an incoming pulse, and reflective at all other frequencies. Mirror 43, on the other hand, is transmissive at a desired output frequency $f_2$, and reflecting at all other frequencies including $f_1$. As a consequence, an input pulse passes through mirror 42 and is frequency shifted on its first traversal of crystal 41, reflected by mirror 43, frequency shifted again, and reflected by mirror 42. Reflections continue until the frequency of the pulse is shifted to the transmitting frequency of mirror 43, whereupon the pulse exits from the resonator through mirror 43. Where the total time involved in making the number of desired traversals exceeds the length of a half cycle, mirrors 42 and 43 can be spaced sufficiently far apart so that each succeeding traversal coincides with the succeeding cycle of the wave, thus maintaining synchronism.

Utilizing the principles of the present invention, shifts of as much as $4.8 \times 10^9$ c.p.s. have been achieved. As pointed out before, greater shifts may be achieved by controlling various parameters of the system. In addition, since the shifting effect is cumulative, several crystals may be cascaded to achieve even greater shifts. Also, because of this additive effect, where a first crystal is enclosed in a cavity resonant at the fundamental frequency, the harmonics to be used to change the wave shape, as discussed heretofore, may be applied to a second crystal in optical series with the first.

The embodiments of the invention have all been disclosed using an electro-optic crystal. There are many other materials which exhibit an index of refraction change with magnetic field, temperature, acoustic waves, and the like. It is intended that such materials not be excluded from the scope of this invention.

The foregoing discussion is intended to illustrate the principes of the invention. Numerous applications of these principles to various arrangements may occur to workers in the art without departure from the spirit and scope of the invention.

What is claimed is:

1. An optical frequency shifting arrangement comprising a source of a continuous train of equally spaced coherent optical frequency pulses,
   a member of electro-optic material,
   means for directing the pulses from said source through said member,
   means for applying a sinusoidal electric field to said member having a frequency corresponding to the periodicity of said pulses,
   and means for adjusting the phase of the applied field relative to the phase of the pulses traversing said member whereby the pulses traverse said member during that portion of the cycle of the applied field where the index of refraction of said member is undergoing a maximum rate of change.

2. The arrangement as claimed in claim 1 wherein said member is a crystal of lithium metaniobate.

3. The arrangement as claimed in claim 1 wherein said source of pulses comprises a mode-locked laser.

4. The arrangement as claimed in claim 3 wherein the electric field applied to said member is derived from the output of said mode-locked laser.

5. The arrangement as claimed in claim 1 and further including means for causing the pulses to make a plurality of traversals of said member.

6. The arrangement as claimed in claim 5 wherein said last mentioned means comprises first and second partially transmitting mirrors adjacent the ends of said member, said first member being transparent to the frequency of the applied pulses and reflective of other frequencies and said second member being reflective at the frequency of the applied pulses and transparent to pulses of a frequency differing from that of the applied pulses.

References Cited

UNITED STATES PATENTS

| | | | |
|---|---|---|---|
| 3,239,671 | 3/1966 | Buhrer | 250—199 |
| 3,262,058 | 7/1966 | Ballman et al. | 250—199X |
| 3,277,392 | 10/1966 | Nicolai | 331—94.5 |
| 3,309,526 | 3/1967 | Giordmaine | 330—4.5X |
| 3,325,646 | 6/1967 | Reichel et al. | 250—199 |
| 3,328,723 | 6/1967 | Giordmaine et al. | 331—107 |
| 3,412,251 | 11/1968 | Hargrove | 331—94.5X |
| 3,418,086 | 12/1968 | Loiacono | 23—301 |
| 3,432,770 | 3/1969 | Massey | 331—94.5 |

FOREIGN PATENTS

| | | | |
|---|---|---|---|
| 1,029,188 | 5/1966 | Great Britain | 331—94.5 |

OTHER REFERENCES

Armstrong et al., "Interactions Between Light Waves in a Nonlinear Dielectric," Phys. Rev. 127(b), Sept. 15, 1962, pp. 1918 and 1937–39.

Buhrer et al., "Optical Frequency Shifting by Electro Optic Effect," App. Phys. Lett., 1 (2), Oct. 1, 1962, pp. 46–49.

Fowler et al., "Electro-Optic Light Beam Deflector," Proc. IBBB (Correspondence), February 1964, pp. 193–4.

White et al., "Frequency Stabilization of Single Mode Gas Lasers," App. Phys. Lett., 5 (5), Sept. 1, 1964, pp. 97–98.

Giordmaine, "Tunable Coherent Parametric Oscillation in $LiNbO_3$ at Optical Frequencies," Phys. Rev. Lett. 14 (24), June 14, 1965, pp. 973–6.

Targ, "Optical Heterodyne Detection of Microwave-Modulated Light," Proc. IEEE, 52 (3), March 1964, pp. 303–4.

Harris et al., "Optical Network Synthesis Using Birefringent Crystals," Proc. IEEE, 52 (4), April 1964, pp. 411–12.

McClure, "Mode Locking of Gas Lasers in Long Cavities," App. Phys. Lett., 7 (6), Sept. 15, 1965, pp. 148–150.

Harris et al., "Controlling Laser Oscillation," Electronics, Sept. 20, 1965, pp. 101–105.

RONALD L. WIBERT, Primary Examiner

R. J. WEBSTER, Assistant Examiner

U.S. Cl. X.R.

332—7.51; 250—199; 350—160